US005268140A

United States Patent [19]

Rutz et al.

[11] Patent Number: 5,268,140

[45] Date of Patent: Dec. 7, 1993

[54] THERMOPLASTIC COATED IRON POWDER COMPONENTS AND METHODS OF MAKING SAME

[75] Inventors: Howard G. Rutz, Newtown, Pa.; Christopher Oliver, Marlton, N.J.; Francis G. Hanejko, Marlton, N.J.; Brooks Quin, Marlton, N.J.

[73] Assignee: Hoeganaes Corporation, Riverton, N.J.

[21] Appl. No.: 830,234

[22] Filed: Jan. 31, 1992

Related U.S. Application Data

[63] Continuation-in-part of Ser. No. 770,648, Oct. 3, 1991, abandoned.

[51] Int. Cl.[5] ........................ B22F 1/00; C04B 35/04; H01F 1/00

[52] U.S. Cl. ........................................ 419/54; 419/53; 252/62.54; 148/301; 264/66

[58] Field of Search ..................... 252/62.54; 148/301, 148/104; 264/126, 66; 419/30, 35, 53, 54

[56] References Cited

U.S. PATENT DOCUMENTS 3,766,096 10/1973 Mastrangelo ....................... 252/513
3,935,340 1/1976 Yamaguchi et al. ................ 427/216
4,106,932 8/1978 Blanchford .......................... 75/252
4,543,208 9/1985 Horie et al. ...................... 252/62.54
4,601,753 7/1986 Soileau et al. ...................... 148/104
4,601,765 7/1986 Soileau et al. ...................... 148/104
4,792,586 12/1988 Han ...................................... 525/88
4,927,473 5/1990 Ochiai et al. ........................ 148/306
4,947,065 8/1990 Ward et al. .......................... 310/44
4,983,231 1/1991 Yamanaka et al. ................ 148/301
5,062,981 11/1991 Nomura et al. .................. 252/62.54
5,063,011 11/1991 Rutz et al. .......................... 264/126

*Primary Examiner*—Donald P. Walsh
*Assistant Examiner*—Anthony R. Chi
*Attorney, Agent, or Firm*—Woodcock Washburn Kurtz Mackiewicz & Norris

[57] ABSTRACT

A method is provided for producing a high strength iron based component by powder metallurgical techniques but without sintering. A powder composition of iron-based particles coated or admixed with a thermoplastic material is compacted under heat and pressure by traditional powder metallurgical techniques. The pressed component is then heat treated at a temperature above the glass transition temperature of the thermoplastic material for a time sufficient to bring the component to the heat treatment process temperature. The resulting component has increased strength and can be used as a structural component or as a magnetic core component.

22 Claims, 2 Drawing Sheets

THERMOPLASTIC COATED IRON POWDER COMPONENTS AND METHODS OF MAKING SAME

RELATED APPLICATIONS

This application is a continuation-in-part of U.S. application Ser. No. 7/770,648, filed Oct. 3, 1991, now abandoned.

FIELD OF THE INVENTION

This invention relates to methods of making high-strength components from a powder composition of thermoplastic-coated iron-based particles. More particularly, the invention relates to a method in which the compositions are molded and pressed, and the pressed component then annealed or heat treated. The method is particularly useful to make magnetic core components.

BACKGROUND OF THE INVENTION

Iron-based particles have long been used as a base material in the manufacture of structural components by powder metallurgical methods. The iron-based particles are first molded in a die under high pressures in order to produce the desired shape. After the molding step, the structural component usually undergoes a sintering step to impart the necessary strength to the component.

Magnetic core components have also been manufactured by such power metallurgical methods, but the iron-based particles used in these methods are generally coated with a circumferential layer of insulating material.

Two key characteristics of an iron core component are its magnetic permeability and core loss characteristics. The magnetic permeability of a material is an indication of its ability to become magnetized, or its ability to carry a magnetic flux. Permeability is defined as the ratio of the induced magnetic flux to the magnetizing force or field intensity. When a magnetic material is exposed to a rapidly varying field, the total energy of the core is reduced by the occurrence of hysteresis losses and/or eddy current losses. The hysteresis loss is brought about by the necessary expenditure of energy to overcome the retained magnetic forces within the iron core component. The eddy current loss is brought about by the production of electric currents in the iron core component due to the changing flux caused by alternating current (AC) conditions.

Early magnetic core components were made from laminated sheet steel, but these components were difficult to manufacture and experienced large core losses at higher frequencies. Application of these lamination-based cores is also limited by the necessity to carry magnetic flux only in the plane of the sheet in order to avoid excessive eddy current losses. Sintered metal powders have been used to replace the laminated steel as the material for the magnetic core component, but these sintered parts also have high core losses and are restricted primarily to direct current (DC) operations.

Research in the powder metallurgical manufacture of magnetic core components using coated iron-based powders has been directed to the development of iron powder compositions that enhance certain physical and magnetic properties without detrimentally affecting other properties. Desired properties include a high permeability through an extended frequency range, high pressed strength, low core losses, and suitability for compression molding techniques.

When molding a core component for AC power applications, it is generally required that the iron particles have an electrically insulating coating to decrease core losses. The use of a plastic coating (see U.S. Pat. No. 3,935,340 to Yamaguchi) and the use of doubly-coated iron particles (see U.S. Pat. No. 4,601,765 to Soileau et al.) have been employed to insulate the iron particles and therefore reduce eddy current losses. However, these powder compositions require a high level of binder, resulting in decreased density of the pressed core part and, consequently, a decrease in permeability. Moreover, although the strength of pressed parts made from such powder compositions would generally be increased by sintering, the desired end-utility of the parts precludes such a processing step; the elevated temperatures at which sintering of the core metal particles normally occurs would degrade the insulating material and generally destroy the insulation between individual particles by forming metallurgical bonds between them.

SUMMARY OF THE INVENTION

The present invention provides a method of making a high strength component, particularly a magnetic core component, by die-pressing a powder composition of thermoplastic coated iron-based particles at a temperature exceeding the glass transition temperature of the coating material, and then annealing the pressed part at a temperature at least as high as the original pressing temperature. The method enhances the strength of the pressed part without the need for sintering.

The method is applicable to any powder composition of iron particles in combination with an organic thermoplastic material where the thermoplastic material constitutes from about 0.001% to about 15% of the combined weights of the iron particles and thermoplastic. Generally, the thermoplastic material is present as a coating on the individual iron particles, but the thermoplastic can also be present in the form of discrete particles that are intimately admixed with the iron particles. Preferably the thermoplastic material is a polyphenylene ether or a polyetherimide. According to the method, the powder composition is pressed in a die at a temperature above the glass transition temperature of the thermoplastic material for a time sufficient to form an integral component, and the compacted component is then heat-treated at a temperature at least as high as the temperature at which it was pressed. In a preferred embodiment, the compacted component is cooled to a temperature at least as low as the glass transition temperature prior to the heat treatment step.

The heat-treating step is preferably conducted at a temperature up to about 250° F. above the pressing temperature. Most preferably, the thermoplastic material is present as a coating on the surfaces of the individual iron particles. In further variations of this embodiment, the iron particles can be doubly-coated, such as where, in addition to an outer layer of the thermoplastic material, the particles have a first, inner coating of an insulative material such as iron phosphate.

DETAILED DESCRIPTION OF PREFERRED EMBODIMENTS

Figure 1:
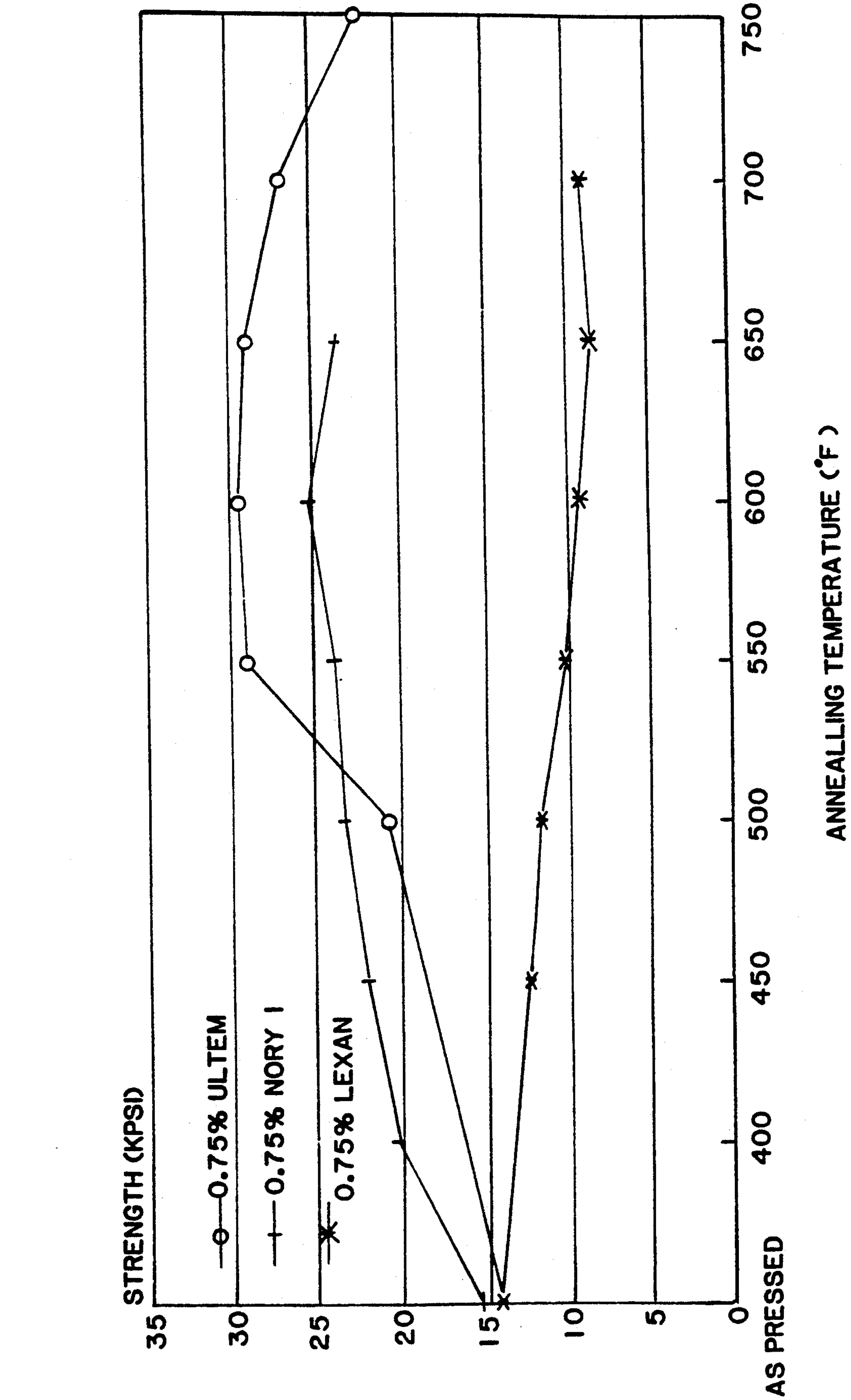
FIG. 1 depicts the strength of pressed components of the invention as a function of heat-treating temperature.

According to the present invention, it has been found that the of iron core components made, via powder metallurgical methods, from a powder composition of thermoplastic-coated iron particles can be enhanced by subjecting the die-pressed part to a heat-treating or annealing step. As shown, for example, in allowed U.S. application Ser. No. 7/365,186, (filed Jun. 12, 1989), magnetic core components have been made by compacting in a die a powder composition of iron particles having an outer coating of thermoplastic material, followed by heating the die and composition above the glass transition temperature of the thermoplastic and applying a pressure of 5-100 tons per square inch (tsi). The compacted part was substantially finished upon removal from the die and cooling. It has now been found, however, that the strength, and in certain cases the magnetic properties, of such parts can be improved by subjecting the part to a heating or annealing step in which it is separately heated to a temperature equal to or above that at which it was pressed. Components produced by the method of this invention exhibit increased strength even without a sintering step and retain their magnetic properties.

The method of the present invention is particularly useful as applied to a powder composition comprising particles of iron core material having an outer coating of an organic thermoplastic material. The starting iron-based core particles are high-compressibility powders of iron or ferromagnetic material having a weight average particle size of about 1-500 microns, although for some applications a weight average particle size up to about 850 microns can be used. Preferred are particles in the range of about 10-350 microns and more preferred in the range of about 10-250 about 13% by weight of the particles below 325 mesh and about 7% by weight of the particles greater than 100 mesh with the remainder between these two sizes. The ANCORSTEEL 1000 C powder typically has an apparent density of from about 2.8 to about 3.0 g/cm$^3$.

The iron-based particles of the invention have a substantially uniform coating of the thermoplastic material. Preferably, each particle has a substantially uniform circumferential coating. The coating can be applied by any method that substantially uniformly coats the individual iron particles with the thermoplastic material. Preferably sufficient thermoplastic material is used to provide a coating of about 0.001-15% by weight of the iron particles as coated. Generally the thermoplastic material is present in an amount of at least about 0.2% by weight. In preferred applications, a coated powder is used in which the thermoplastic material is about 0.4-2% by weight, and more preferably out 0.6-0.9% is about 0.4-2% by weight, and more preferably about 0.6-0.9% by weight, of the coated particles. The use of iron-based powders having an outer coating of thermoplastic material as described above provides advantages for magnetic core components such as improved pressed strength and the ability to mold magnetic components of complex shapes that have a substantially uniform magnetic permeability over a wide frequency range.

The iron particles can first be coated with another insulative inorganic material to provide an inner coating that underlies the coating of thermoplastic material. This inner coating is preferably no greater than about 0.2% by total weight of the doubly coated particles. Such inner coatings include iron phosphate as discussed in allowed U.S. application Ser. No. 07/365,186, filed Jun. 12, 1989, and alkaline metal silicates, such as disclosed in U.S. Pat. No. 4,601,765. The disclosures of both documents are hereby incorporated by reference.

The thermoplastic materials used in the coated powders of this invention are polymers having a weight average molecular weight in the range of about 10,000 to 50,000 having a level of crystallinity that allows them to be dissolved in an organic solvent. Generally the polymers will have a glass transition temperature in the range of about 175°-450° F. It has been found that the method of the present invention is particularly advantageous for use with iron core particles coated with a polyphenylene ether or polyetherimide, which are the preferred thermoplastic materials for use herein.

A suitable polyphenylene ether thermoplastic is poly(2,6-dimethyl-1,4-phenylene oxide) which has an empirical formula of $(C_8H_8O)_n$. The polyphenylene ether homopolymer can be admixed with an alloying/blending resin such as a high impact polystyrene, such as poly(butadiene-styrene); or a polyamide, such as Nylon 66, either as polycaprolactam or poly(hexamethylenediamine-adipate). These thermoplastic materials have a specific gravity in the range of about 1.0 to 1.4. A commercially available polyphenylene is sold under the trademark NORYL ®resin by the General Electric Company. The most preferred NORYL ® resins are the NORYL ® 844, 888, and 1222 grades.

A suitable polyetherimide thermoplastic is poly[2,2,-bis(3,4-dicarboxyphenoxy) phenylpropane)-2-phenylene bismide] which has an empirical formula of $(C_{37}H_{24}O_6N_2)_n$ where n is 15-27. The polyetherimide thermoplastics have a specific gravity in the range of about 1.2 to 1.6. A commercially available polyetherimide is sold under the trade name ULTEM ® resin by the General Electric Company. The most preferred ULTEM ® resin is the ULTEM ® 1000 grade.

A preferred method for applying the thermoplastic coating to the iron core particles, whether or not the particles have a first coating of insulative material as described above, uses a fluidized bed process. This process can be conducted in a Wurster coater such as manufactured by Glatt, Inc. According to such a fluidized bed process, the iron particles are fluidized in air, and a solution of the thermoplastic material in an appropriate organic solvent is sprayed through an atomizing nozzle into the inner portion of the Wurster coater, where the solution contacts the fluidized bed of iron particles. Any organic solvent for the thermoplastic material can be used, but preferred solvents are methylene chloride and 1,1,2 trichloroethane. The concentration of thermoplastic material in the coating solution is preferably at least 3% and more preferably about 5-10% by weight. The use of a peristaltic pump to transport the thermoplastic solution to the nozzle is preferred. The fluidized iron particles are preferably heated to a temperature of at least about 25° C., more preferably at least about 30° C., but below the solvent boiling point, prior to being contacted with the solution of thermoplastic material. The iron particles are wetted by the droplets of dissolved thermoplastic, and the wetted particles are then transferred to an expansion chamber in which the solvent is removed from the particles by evaporation, leaving a substantially uniform outer coating of thermoplastic material around the iron core particles.

The amount of thermoplastic material coated onto the iron particles can be monitored or controlled by various means, such as by operating the coater apparatus in a batchwise fashion and administering the amount of thermoplastic necessary for the desired coating percentage at a constant rate during the batch cycle. Another method is to take samples continuously from the particles being coated within the fluidized bed and to test for carbon content, using known correlations to the thermoplastic content.

Preferred thermoplastic-coated iron particles are characterized by having an apparent density of about 2.4–2.7 g/cm$^3$ and a thermoplastic coating that constitutes about 0.4–2% by weight of the particles as coated. It has been found that components made from particles within these limits exhibit superior magnetic properties.

A preferred process for the production of the thermoplastic coated particles employs a Glatt GPCG-5 Wurster coater having a 17.8 cm (7 in.) coating insert. In one specific example, a 17 kg (37.5 lb.) load of ANCORSTEEL A1000C iron powder (from Hoeganaes Co.) having an apparent density of about 3.0 g/cm$^3$ is charged into the coater. This powder is fluidized and maintained at a process temperature of about 33–37° C. A solvent is sprayed into the coater to clean out the nozzle assembly. A solution (7.5 weight percent concentration) of ULTEM® resin 1000 grade polyetherimide in methylene chloride is sprayed into the coater via a peristaltic pump at a rate of about 110–120 grams of solution per minute. The solution is atomized through a 1.2 mm nozzle at the bottom of the coater with a 4 bar atomizing pressure. The coater is operated at a 40% air flap setting with an "A" plate with an inlet air temperature of about 35°–40° C. The process continues until about 1,700 g (3.75 lb) of solution are sprayed into the coater. The solution addition is then stopped, but the coated powder is maintained in a fluidized state until the solvent evaporates. The final coated powder has a thermoplastic content of about 0.75% by weight.

In an alternative embodiment of the present invention, the thermoplastic material is in particulate form and is admixed with the iron particles to form a powder composition of discrete particles of the iron-based material in intimate admixture with discrete particles of thermoplastic material. The thermoplastic particles are generally in a size below about 400 microns. Preferably the particles are fine enough to pass through a No. 60 sieve, U.S. Series, (about 250 microns or less), more preferably through a No. 100 sieve (about 150 microns or less), and most preferably through a No. 140 sieve (about 100–105 microns or less) in order to reduce segregation and enhance the mixing between the iron and thermoplastic particles. The amount of thermoplastic is generally about 0.001–15% by weight of the admixed iron/thermoplastic composition, preferably at least about 0.2% by weight, more preferably about 0.4–2% by weight, and most preferably about 0.6–0.9% by weight.

This admixture of iron particles and thermoplastic particles can be prepared by conventional mixing techniques to form a substantially homogeneous particle mixture. In a preferred embodiment, this dry admixture is then contacted with a solvent for the thermoplastic material in an amount sufficient to wet the particles, and more particularly to soften and/or partially dissolve the surfaces of the polymeric particles, causing those particles to become tacky and to adhere or bond to the surfaces of the iron particles. Preferably the solvent is applied to the dry admixture by spraying fine droplets of the solvent during mixing of the dry blend. Most preferably mixing is continued throughout the solvent application to ensure wetting of the polymer materials and homogeneity of the final mixture. The solvent is thereafter removed by evaporation, optionally with the aid of heating, forced ventilation, or vacuum. Mixing can be continued during the solvent removal step, which will itself aid evaporation o the solvent. The initial dry blending of the particles as well as the application and removal of the solvent can be effected in conventional mixing equipment outfitted with suitable solvent application and recovery means. The conical screw mixers available from the Nauta Company can be used for this purpose.

Any organic solvent for the polymeric material can be used. Preferred are methylene chloride, 1,1,2-trichloroethane, and acetone. Blends of these solvents can also be used. A preferred combination for use in this invention uses a polyetherimide thermoplastic as the polymeric material and methylene chloride as the solvent. The amount of solvent applied to the dry admixture will be about 1.5–50 weight parts, preferably about 3–20 weight parts, of solvent per unit weight part of polymer.

The powder composition of thermoplastic-coated iron powders or iron/thermoplastic particle powders, each as above described, can be formed into molded components by an appropriate molding technique employing sufficient heat to soften the thermoplastic material. In preferred embodiments, a compression molding process, utilizing a die heated to a temperature above the glass transition temperature of the thermoplastic material, is used to form the components. The die is generally heated to a temperature that is about 50–150 degrees Fahrenheit, preferably about 100–150 degrees Fahrenheit, above the glass transition temperature. The powder mixture is charged into the die, and normal powder metallurgy pressures are applied at the indicated temperatures to press out the desired component. Typical compression molding techniques employ compaction pressures of from about 5 to 100 tons per square inch (tsi), preferably in the range of about 30 to 60 tsi. The temperature and pressures used in the compression molding step are generally those that will be sufficient to form a strong integral part from the powder composition.

A lubricant can be employed with the iron powder mixture in order to reduce the stripping and sliding pressures experienced with the use of the compression molding technique described above. One such lubricant is particulate boron nitride, which can be admixed with the coated powders in an amount of from about 0.1% to about 0.3% by weight of the coated powder.

An injection molding process can also be applied to mold the components of the present invention. Generally, the composition will have been made from iron-based particles of very fine size, preferably from about 10–100 microns, when injection molding is to be employed. In the preparation of a coated iron powder mixture for use in an injection molding apparatus, the thermoplastic material can generally be admixed with the iron powder using a traditional compounding system. The thermoplastic material and the iron particles are fed through a screw blender, which has been heated to a temperature of at least 50 degrees F above, and preferably 100–150 degrees F above, the glass transition temperature of the thermoplastic. During the course of this process, the thermoplastic material is melted and mixed with the iron particles as the materials are pressed through the screw. The resulting mixture is extruded into pellet form to be fed into the injection molding apparatus. The powder mixture can also be prepared by the fluidized bed process described above. In either event, when the composition is intended for use in an injection molding process, it is preferred that the thermoplastic material constitute about 8% to about 15% by weight of the coated particles.

Following the compaction step, the molded component is heat treated in order to "cure" the thermoplastic material and provide a component with superior strength. The molded component, preferably after removal from the die and after being permitted to cool to at least the glass transition temperature, is then separately heated to a process or annealing temperature that is above the glass transition temperature of the thermoplastic material. The process temperature is preferably up to about 250° F. above, more preferably in the range of 50°-250° F. above, the temperature at which the component was compacted. The temperature is generally controlled so as to be below the flash point of the thermoplastic material. For most thermoplastic materials, the process temperature will be about 200°-800° F., preferably about 450°-800° F., and most preferably between about 450°-650° F. The molded component is maintained at the process temperature for a time sufficient for the component to be thoroughly heated and its internal temperature brought substantially to the process temperature. Generally heating is required for about 0.5 to 3 hours, depending on the size and initial temperature of the part. The heat treatment can be conducted in air or in an inert atmosphere such as nitrogen.

The heat treatment is a separate heating step from the compaction process. It has been found, however, that the performance of the heat treatment step can occur at any time after compaction. That is, the heat treatment step can proceed immediately after compaction with no intervening cooling, or it can proceed, after compaction, after the component has cooled or been permitted to cool to a temperature at least as low as the glass transition temperature, and optionally as low as ambient temperature.

The benefits of this method to produce a molded component are seen by the following data. In Table 1, the temperature-related physical characteristics of certain thermoplastic materials are shown. The ULTEM ® and NORYL ® materials are described above. The LEXAN ® (grade 121) material is a bisphenol-A-polycarbonate, also known as poly(bisphenol-A-carbonate), having a specific gravity of about 1.2 to 1.6. More specifically, the LEXAN ® material is poly(oxycarbonyloxy-1,4-phenylene-(1-methylethlidene)-1,4-phenylene) having an empirical formula of $(C_{16}H_{14}O_3)_n$ where n=30 to 60. The LEXAN ® resin is available from General Electric Company.

TABLE 1

Temperature-Related Parameters (°F.)

| | | ULTEM ® 1000 | NORYL ® 1222 | LEXAN ® 121 |
|---|---|---|---|---|
| Glass Transition Temperature | | 423 | 194-270 | 302 |
| Thermal | 1% | 986 | 480 | 788 |
| Decomposition | 50% | 1238 | 840 | 896 |
| Ignition | Flash | 970 | 752 | 840 |

TABLE 1-continued

Temperature-Related Parameters (°F.)

| | ULTEM ® 1000 | NORYL ® 1222 | LEXAN ® 121 |
|---|---|---|---|
| Self | 1000 | 914 | 1070 |

Experiments were conducted using test bars prepared from a powder composition of A1000C iron particles (Hoeganaes Corp.) that were coated with 0.75% by weight of a thermoplastic material as identified below. The test bars were uniformly molded at 40 tons per square inch (tsi) in a compression molding process. The bars were pressed at a temperature of 400° F. for the NORYL ® material, 525° F. for the ULTEM ® material, and 450° F. for the LEXAN ® material. The pressing temperatures were chosen to be within the range of 100°-150° F. above the glass transition temperature of the respective thermoplastic material. The heat treatment process temperature was varied in 50° F. increments from about the pressing temperature to about 250° F. above the pressing temperature. The components were heat treated for one hour in air immediately following the compaction step. Table 2 discloses the densities of the pressed components and the effect that the heat treatment step had on the density in comparison to the reference ("as pressed") component, which was not heat-treated.

TABLE 2

Densities of Pressed Parts Before and After Heat Treatment

A1000C Iron Particles with 0.75% Thermoplastic Pressed at 40 TSI-Heat Treated in Air for 60 Min

| | Density g/cm³ | | |
|---|---|---|---|
| Heat Treatment Temp. (°F.) | ULTEM ® 1000 | NORYL ® 1222 | LEXAN ® 121 |
| As Pressed | 7.32 | 7.24 | 7.29 |
| 400 | — | 7.25 | — |
| 450 | — | 7.25 | 7.27 |
| 500 | 7.34 | 7.25 | 7.27 |
| 550 | 7.33 | 7.24 | 7.25 |
| 600 | 7.32 | 7.24 | 7.22 |
| 650 | 7.29 | 7.23 | 7.23 |
| 700 | 7.23 | — | 7.23 |
| 750 | 7.21 | — | — |

The transverse rupture strength of the test components was determined as described in Materials Standards for PM Structured Parts, Standard 41, published by Metal Powder Industry Federation (1990-91 Ed.). The strength data is shown in FIG. 1. The components made from iron powder coated with ULTEM ® and NORYL ® materials exhibited surprising increases in strength at the higher heat treatment temperatures; in the case of the component made from ULTEM ® coated powders, the strength nearly doubled. The strength of the component made with LEXAN ®-coated powders decreased, however.

The atmosphere in which the heat treating is conducted is not thought to affect the final strength of the component. In Table 3 is shown a comparison between heat treatment conducted in air and in a nitrogen atmosphere. The materials used were A1000C iron particles coated with 0.75 weight percent of the indicated thermoplastic material pressed at 40 tsi and then heat treated, immediately following compaction, at 600° F. for 60 minutes. Although slight increases in strength were observed for the nitrogen environment, it is unclear whether or not these increases in strength are the result of a lack of oxygen during the heat treatment step.

TABLE 3

| Transverse Rupture Strength (kPSI) | | |
|---|---|---|
| Thermoplastic (Press temp.) | Air | Nitrogen |
| ULTEM ® 1000 (525° F.) | 29.4 | 34.2 |
| NORYL ® 1222 (400° F.) | 25.1 | 26.1 |
| LEXAN ® 121 (450° F.) | 9.2 | 11.4 |

In Table 4 is shown the effect of the time of heat treatment on the strength of the component. The materials used were A1000C iron particles coated with 0.75 weight percent of the indicated thermoplastic material pressed at 40 tsi and heat treated, immediately following compaction, at 600° F. in air. The length of the heat treatment step is not considered to affect the strength of the component. The heat treatment step should however be continued until the internal temperature of the component is brought substantially to the process temperature.

TABLE 4

| Transverse Rupture Strength (kPSI) | | | |
|---|---|---|---|
| Thermoplastic | Heat Treatment Duration | | |
| (Press Temp.) | 30 min | 60 min | 120 min |
| ULTEM ® 1000 (525° F.) | 33.6 | 29.4 | 34.9 |
| NORYL ® 1222 (400° F.) | 24.5 | 25.1 | 24.9 |

Figure 2:
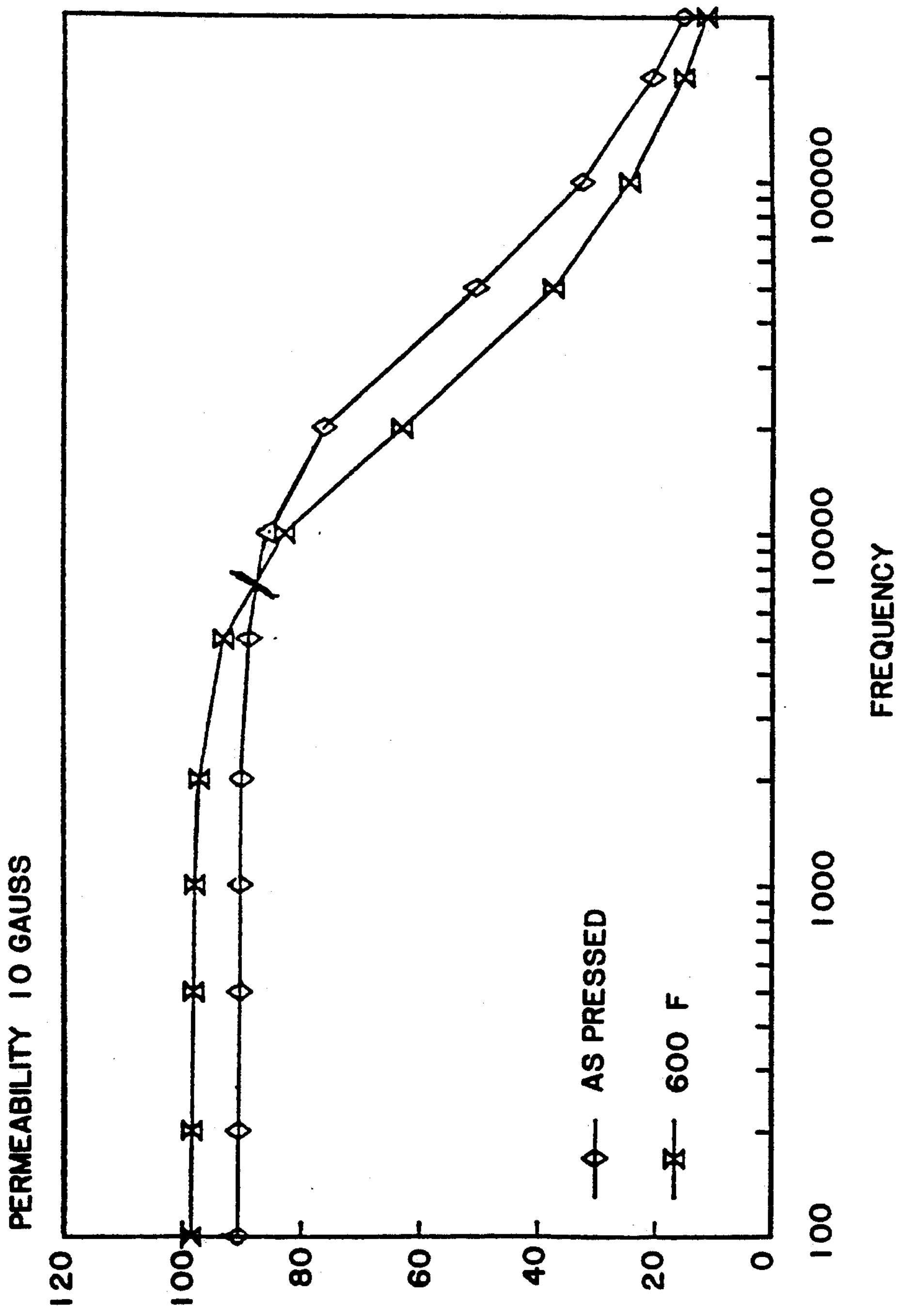
FIG. 2 depicts the initial permeability of the pressed components of the invention compared to pressed components that were not heat-treated in accordance with the invention.

As show in FIG. 2, for low frequency operations, that is, frequencies below about 8000 cps, the heat treated component has higher permeability. The powder used, referred to as 423A, has a weight average particle size of about 170 microns, and is further characterized as an annealed sponge iron powder having a typical apparent density of about 2.3-2.6 g/cm$^3$ and a particle size distribution, by weight, of 0.1% +40 mesh, 19.3% +60 mesh, 39.3% +80 mesh, 15.4% +100 mesh, 16.5% +200 mesh, and 9.4% +250 mesh. The powder was coated with 0.75 weight percent of ULTEM ® 1000 resin and pressed at 40 tsi at 525° F. The heat treated components were thereafter cured at 600° F. in air for 1 hour. The "As Pressed" component was not subjected to a heat treating step after the compaction.

In Table 5 is shown a comparison of an admixed iron/thermoplastic particle powder composition with and without heat treatment. An iron/thermoplastic particle powder was prepared by admixing Ancorsteel 1000C iron particles with particulate ULTEM ® 1000 polyetherimide screened to exclude particles larger than 100 mesh (0.006 in., 0.015 cm). The final powder contained 0.6% by weight of the thermoplastic. The powder composition was pressed at 525° F. at compaction pressures of from 30 to 50 tsi. Heat treatment was at 600° F. for one hour. The admixed powder had an increased green strength of from about 40-60% after the heat treating step.

TABLE 5

| Admixture of Iron and Thermoplastic Particles: Properties With/Without Heat Treatment | Compaction Pressure (TSI) | Green Strength (psi) | Density (g/cm$^3$) |
|---|---|---|---|
| (Control - No heat treatment) | 30 | 14088 | 7.021 |
| | 40 | 14084 | 7.254 |
| | 50 | 16014 | 7.395 |
| Heat Treated @600° F., 1 Hr. | 30 | 20457 | 7.018 |
| | 40 | 22936 | 7.265 |
| | 50 | 22501 | 7.386 |

What is claimed:

1. A method of making a high strength powder metallurgical component comprising the steps of:
   (a) providing an iron-based power composition comprising iron particles having an outer coating of a thermoplastic material, the thermoplastic material constituting from about 0.001% to about 15% by weight of the iron particles as coated;
   (b) compacting the composition in a die at a temperature above the glass transition temperature of the thermoplastic; and
   (c) separately heating the component at a temperature that is at least as high as the compaction temperature, up to about 800° F.
2. The method according to claim 1 wherein the compacted component is allowed to cool to a temperature at least as low as the glass transition temperature of the thermoplastic prior to said heating step.
3. The method according to claim 2 wherein the thermoplastic material is selected from the group consisting of polyphenylene ethers and polyetherimides and wherein the thermoplastic material constitutes about 0.4-2% by weight of the coated materials.
4. The method according to claim 3 wherein said heating step is conducted at a temperature of from about 450°-800° F.
5. The method of claim 3 wherein the compaction step is conducted at a pressure of 30-60 tsi and a temperature in the range of about 50-150° F. above the glass transition temperature of the thermoplastic material.
6. The method according to claim 5 wherein the iron particles have a weight average particle size of about 10-200 microns and the heating step is conducted at a temperature of about 450°-800° F.
7. The method according to claim 1 wherein the iron core particles have a first, inner coating of an insulative inorganic material.
8. The method according to claim 6 wherein the iron core particles have a first, inner coating of an insulative inorganic material.
9. The method according to claim 1 wherein the compaction step comprises compression molding.
10. The method according to claim 1 wherein the compaction step comprises an injection molding process and wherein the thermoplastic material constitutes at least about 8% by weight of the coated particles.
11. The product produced by the method of claim 1.
12. The product produced by the method of claim 2.
13. The product produced by the method of claim 3.
14. The product produced by the method of claim 4.
15. The product produced by the method of claim 7.
16. A method of making a high strength powder metallurgical component comprising the steps of:
   (a) providing an iron/thermoplastic powder composition comprising iron particles admixed with a thermoplastic material in particulate form, the thermoplastic material constituting from about 0.001% to about 15% by weight of the composition;

(b) compacting the composition in a die at a temperature above the glass transition temperature of the thermoplastic; and (c) separately heating the component to a temperature that is at least as high as the composition temperature, up to about 800° F.

17. The method according to claim 16 wherein the compacted component is allowed to cool to a temperature at least as low as the glass transition temperature of the thermoplastic prior to said heating step.

18. The method according to claim 17 wherein the thermoplastic material is selected from the group consisting of polyphenylene ethers and polytherimides, and wherein the thermoplastic material constitutes about 0.4–2% by weight of the composition.

19. The method according to claim 18 wherein said heating step is conducted at a temperature of about 450°-800° F.

20. The method of claim 18 wherein the compaction step is conducted at a pressure of 30–60 tsi and a temperature in the range of about 150°-150° F. above the glass transition temperature of the thermoplastic material.

21. The method according to claim 20 wherein the iron particles have a weight average particle size of about 10–200 microns, and the heating step is conducted at a temperature of about 450°-800° F.

22. The method according to claim 16 wherein the iron/thermoplastic powder composition is made by a method comprising the steps of (a) forming a dry admixture of the iron particles and particles of thermoplastic material; (b) wetting the dry admixture with a solvent for the thermoplastic material; and (c) removing the solvent.

* * * * *

UNITED STATES PATENT AND TRADEMARK OFFICE

CERTIFICATE OF CORRECTION

PATENT NO. : 5,268,140

DATED : December 7, 1993

INVENTOR(S) : Howard G. Rutz et al

It is certified that error appears in the above-identified patent and that said Letters Patent is hereby corrected as shown below:

Column 3, line 39, after "10-250" insert the following missing material -- microns. An example of such a metallurgy grade powder is ANCORSTEEL 1000C powder, available from Hoeganaes Corporation, Riverton, New Jersey. This product is a powder of substantially pure iron having a typical screen profile of --

Column 3, line 57, after "0.6-0.9%" delete -- is about 0.4 -2% by weight, and more preferably about 0.6-0.9% -- This phrase duplicates previous lines.

Column 6, line 10, "o" should be -- of --

UNITED STATES PATENT AND TRADEMARK OFFICE

CERTIFICATE OF CORRECTION

PATENT NO. : 5,268,140

DATED : December 7, 1993

INVENTOR(S) : Howard G. Rutz, et al

It is certified that error appears in the above-indentified patent and that said Letters Patent is hereby corrected as shown below:

Column 12, claim 21, line 10, after "microns," insert the following missing material -- the thermoplastic material particles are below about 200 microns, --

Signed and Sealed this

Twenty-fourth Day of May, 1994

Attest:

Bruce Lehman

BRUCE LEHMAN

*Attesting Officer* *Commissioner of Patents and Trademarks*